United States Patent
Hormati et al.

(10) Patent No.: US 10,999,106 B2
(45) Date of Patent: *May 4, 2021

(54) MULTIDROP DATA TRANSFER

(71) Applicant: Kandou Labs, S.A., Lausanne (CH)

(72) Inventors: Ali Hormati, Ecublens Vaud (CH); Amin Shokrollahi, Préverenges (CH)

(73) Assignee: KANDOU LABS, S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/351,226

(22) Filed: Mar. 12, 2019

(65) Prior Publication Data

US 2019/0215195 A1 Jul. 11, 2019

Related U.S. Application Data

(63) Continuation of application No. 15/894,516, filed on Feb. 12, 2018, now Pat. No. 10,230,549, which is a
(Continued)

(51) Int. Cl.
*H03D 1/04* (2006.01)
*H04L 25/02* (2006.01)
(Continued)

(52) U.S. Cl.
CPC .......... *H04L 25/0272* (2013.01); *G06F 13/38* (2013.01); *H04L 25/4906* (2013.01); *H04L 25/4917* (2013.01)

(58) Field of Classification Search
CPC ............. H04L 25/0272; H04L 25/4906; H04L 25/4917; G06F 13/38
(Continued)

(56) References Cited

U.S. PATENT DOCUMENTS 3,629,824 A 12/1971 Bossen
3,965,418 A 6/1976 Bauer et al.
(Continued)

FOREIGN PATENT DOCUMENTS

CN 1671092 A 9/2005
CN 101820288 B 1/2013
(Continued)

OTHER PUBLICATIONS

Ben-Neticha, Zouhair , et al., "The "Stretched"-Golay and Other Codes for High-SNR Finite-Delay Quantization of the Gaussian Source at ½ Bit Per Sample", IEEE Transactions on Communications, New York, US, vol. 38, No. 12, XP000203339, Dec. 1990, 2089-2093 (5 pages).
(Continued)

*Primary Examiner* — Helene E Tayong
(74) *Attorney, Agent, or Firm* — Invention Mine LLC

(57) ABSTRACT

Multi-drop communications channels can have significantly deep notches in their frequency response causing a corresponding limitation of the effective data transmission rate. A special time-ordered coding method is described which results in the emitted spectrum of the data stream transmitted into the channel having a notch at the same frequency as the notch in the channel frequency response, permitting channel receivers to successfully decode the transmitted data stream. The described coding method may be applied at various multiples of the channel notch frequency to support different throughput rates, and may be combined with other coding techniques such as group or vector signaling codes.

20 Claims, 8 Drawing Sheets

Related U.S. Application Data continuation of application No. 15/264,334, filed on Sep. 13, 2016, now Pat. No. 9,893,911, which is a continuation of application No. 14/803,996, filed on Jul. 20, 2015, now Pat. No. 9,444,654.

(60) Provisional application No. 62/026,860, filed on Jul. 21, 2014.

(51) Int. Cl.
*H04L 25/49* (2006.01)
*G06F 13/38* (2006.01)

(58) Field of Classification Search
USPC .......................................................... 375/346
See application file for complete search history.

(56) References Cited

U.S. PATENT DOCUMENTS

| | | | |
|---|---|---|---|
| 4,112,264 A | 9/1978 | Abramson et al. | |
| 4,486,739 A | 12/1984 | Franaszek et al. | |
| 4,772,845 A | 9/1988 | Scott | |
| 4,864,303 A | 9/1989 | Ofek | |
| 5,168,509 A | 12/1992 | Nakamura et al. | |
| 5,566,193 A | 10/1996 | Cloonan | |
| 5,825,808 A | 10/1998 | Hershey et al. | |
| 5,875,202 A | 2/1999 | Venters et al. | |
| 5,881,130 A | 3/1999 | Zhang | |
| 6,097,732 A | 8/2000 | Jung | |
| 6,119,263 A | 9/2000 | Mowbray et al. | |
| 6,128,330 A | 10/2000 | Schilling | |
| 6,175,230 B1 | 1/2001 | Hamblin et al. | |
| 6,188,497 B1 | 2/2001 | Franck et al. | |
| 6,404,820 B1 | 6/2002 | Postol | |
| 6,473,877 B1 | 10/2002 | Sharma | |
| 6,650,638 B1 | 11/2003 | Walker et al. | |
| 6,690,739 B1 | 2/2004 | Mui | |
| 6,865,234 B1 | 3/2005 | Agazzi | |
| 6,963,622 B2 | 11/2005 | Eroz et al. | |
| 6,973,613 B2 | 12/2005 | Cypher | |
| 6,976,194 B2 | 12/2005 | Cypher | |
| 6,982,954 B2 | 1/2006 | Dhong et al. | |
| 7,057,546 B1 | 6/2006 | Secatch et al. | |
| 7,080,288 B2 | 7/2006 | Ferraiolo et al. | |
| 7,082,557 B2 | 7/2006 | Schauer et al. | |
| 7,231,558 B2 | 6/2007 | Gentieu et al. | |
| 7,269,130 B2 | 9/2007 | Pitio | |
| 7,335,976 B2 | 2/2008 | Chen et al. | |
| 7,346,819 B2 | 3/2008 | Bansal et al. | |
| 7,362,130 B2 | 4/2008 | Broyde et al. | |
| 7,362,697 B2 | 4/2008 | Becker et al. | |
| 7,370,264 B2 | 5/2008 | Worley et al. | |
| 7,643,588 B2 | 1/2010 | Visalli et al. | |
| 7,694,204 B2 | 4/2010 | Schmidt et al. | |
| 7,698,088 B2 | 4/2010 | Sul et al. | |
| 7,734,191 B1 | 6/2010 | Welch et al. | |
| 7,882,413 B2 | 2/2011 | Chen et al. | |
| 7,933,770 B2 | 4/2011 | Krueger et al. | |
| 8,091,006 B2 | 1/2012 | Prasad et al. | |
| 8,185,807 B2 | 5/2012 | Oh et al. | |
| 8,209,580 B1 | 6/2012 | Varnica et al. | |
| 8,233,544 B2 | 7/2012 | Bao et al. | |
| 8,245,102 B1 | 8/2012 | Cory et al. | |
| 8,279,094 B2 | 10/2012 | Abbasfar | |
| 8,279,745 B2 | 10/2012 | Dent | |
| 8,341,492 B2 | 12/2012 | Shen et al. | |
| 8,365,035 B2 | 1/2013 | Hara | |
| 8,429,492 B2 | 4/2013 | Yoon et al. | |
| 8,429,495 B2 | 4/2013 | Przybylski | |
| 8,462,891 B2 | 6/2013 | Kizer et al. | |
| 8,521,020 B2 | 8/2013 | Welch et al. | |
| 8,539,318 B2 | 9/2013 | Shokrollahi et al. | |
| 8,578,246 B2 | 11/2013 | Mittelholzer et al. | |
| 8,711,919 B2 | 4/2014 | Kumar | |
| 8,773,964 B2 | 7/2014 | Hsueh et al. | |
| 8,949,693 B2 | 2/2015 | Ordentlich et al. | |
| 9,148,198 B1 | 9/2015 | Zhang et al. | |
| 9,152,495 B2 | 10/2015 | Losh et al. | |
| 9,172,412 B2 | 10/2015 | Kim et al. | |
| 9,183,085 B1 | 11/2015 | Northcott | |
| 9,300,503 B1 * | 3/2016 | Holden | ............... H04L 25/4925 |
| 9,444,654 B2 | 9/2016 | Hormati et al. | |
| 9,455,744 B2 | 9/2016 | George et al. | |
| 9,667,379 B2 | 5/2017 | Cronie et al. | |
| 9,852,806 B2 | 12/2017 | Stauffer et al. | |
| 2001/0000219 A1 | 4/2001 | Agazzi et al. | |
| 2001/0006538 A1 | 7/2001 | Simon et al. | |
| 2002/0154633 A1 | 10/2002 | Shin et al. | |
| 2002/0163881 A1 | 11/2002 | Dhong et al. | |
| 2003/0016770 A1 | 1/2003 | Trans et al. | |
| 2003/0185310 A1 | 10/2003 | Ketchum et al. | |
| 2006/0133538 A1 | 6/2006 | Stojanovic et al. | |
| 2006/0245757 A1 | 11/2006 | Elahmadi et al. | |
| 2006/0269005 A1 | 11/2006 | Laroia et al. | |
| 2006/0291571 A1 * | 12/2006 | Divsalar | ............... H03M 13/116 375/242 |
| 2007/0076871 A1 | 4/2007 | Renes | |
| 2007/0204205 A1 | 8/2007 | Niu et al. | |
| 2007/0283210 A1 | 12/2007 | Prasad et al. | |
| 2008/0016432 A1 | 1/2008 | Lablans | |
| 2009/0110106 A1 | 4/2009 | Wornell et al. | |
| 2009/0141827 A1 | 6/2009 | Saito et al. | |
| 2009/0150754 A1 | 6/2009 | Dohmen et al. | |
| 2009/0316730 A1 | 12/2009 | Feng et al. | |
| 2010/0020898 A1 | 1/2010 | Stojanovic et al. | |
| 2010/0046644 A1 | 2/2010 | Mazet | |
| 2010/0287438 A1 | 11/2010 | Lakkis | |
| 2011/0014865 A1 | 1/2011 | Seo et al. | |
| 2011/0051854 A1 | 3/2011 | Kizer et al. | |
| 2011/0072330 A1 | 3/2011 | Kolze | |
| 2011/0228864 A1 | 9/2011 | Aryanfar et al. | |
| 2011/0299555 A1 | 12/2011 | Cronie et al. | |
| 2012/0036415 A1 | 2/2012 | Shafrir et al. | |
| 2012/0257683 A1 | 10/2012 | Schwager et al. | |
| 2013/0259113 A1 | 10/2013 | Kumar | |
| 2013/0315501 A1 | 11/2013 | Atanassov et al. | |
| 2013/0346830 A1 | 12/2013 | Ordentlich et al. | |
| 2014/0068385 A1 | 3/2014 | Zhang et al. | |
| 2014/0068391 A1 | 3/2014 | Goel et al. | |
| 2015/0070201 A1 | 3/2015 | Dedic et al. | |
| 2015/0092532 A1 | 4/2015 | Shokrollahi et al. | |
| 2016/0020796 A1 | 1/2016 | Hormati et al. | |

FOREIGN PATENT DOCUMENTS

| | | | |
|---|---|---|---|
| EP | 1926267 A1 | 5/2008 | |
| WO | 2005002162 A1 | 1/2005 | |

OTHER PUBLICATIONS

Burr, A.G., "Spherical Codes for M-ARY Code Shift Keying", Second IEE National Conference on Telecommunications, University of York, UK, Apr. 2, 1989, 67-72 (6 pages).

Ericson, Thomas, et al., "Spherical Codes Generated by Binary Partitions of Symmetric Pointsets", IEEE Transactions on Information Theory, vol. 41, No. 1, Jan. 1995, 107-129 (23 pages).

Giovaneli, Carlos Lopez, et al., ""Space-Frequency Coded OFDM System for Multi-Wire Power Line Communications"", Power Line Communications and Its Applications, 2005 International Symposium on Vancouver, BC, Canada, IEEE XP-002433844, Apr. 6-8, 2005, 191-195 (5 pages).

* cited by examiner

Channel

M = 2

M = 3

M = 4

M = 5

M = 6

MULTIDROP DATA TRANSFER

This Application is a continuation of U.S. application Ser. No. 15/894,516, filed Feb. 12, 2018, entitled "Multidrop Data Transfer", naming Ali Hormati and Amin Shokrollahi, which is a continuation of U.S. application Ser. No. 15/264,334, filed Sep. 13, 2016, entitled "Multidrop Data Transfer," naming Ali Hormati and Amin Shokrollahi, which is a continuation of U.S. application Ser. No. 14/803,996, filed Jul. 20, 2015, entitled "Multidrop Data Transfer," naming Ali Hormati and Amin Shokrollahi, which claims the benefit of U.S. Provisional Patent Application No. 62/026,860, filed Jul. 21, 2014, naming Ali Hormati and Amin Shokrollahi, entitled "Multidrop Data Transfer", all of which are hereby incorporated herein by reference in their entirety.

REFERENCES

The following references are herein incorporated by reference in their entirety for all purposes:

U.S. Patent Publication No. 2011/0268225 of U.S. patent application Ser. No. 12/784,414, filed May 20, 2010, naming Harm Cronie and Amin Shokrollahi, entitled "Orthogonal Differential Vector Signaling" (hereinafter "Cronie I");

U.S. Patent Publication No. 2011/0302478 of U.S. patent application Ser. No. 13/154,009, filed Jun. 6, 2011, naming Harm Cronie and Amin Shokrollahi, entitled "Error Control Coding for Orthogonal Differential Vector Signaling" (hereinafter "Cronie II");

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes" (hereinafter "Cronie III");

U.S. Patent Publication No. 2011/0299555 of U.S. patent application Ser. No. 13/154,009, filed Jun. 6, 2011, naming Harm Cronie and Amin Shokrollahi, entitled "Error Control Coding for Orthogonal Differential Vector Signaling" (hereinafter "Cronie IV");

U.S. Provisional Patent Application No. 61/763,403, filed Feb. 11, 2013, naming John Fox, Brian Holden, Ali Hormati, Peter Hunt, John D Keay, Amin Shokrollahi, Anant Singh, Andrew Kevin John Stewart, Giuseppe Surace, and Roger Ulrich, entitled "Methods and Systems for High Bandwidth Chip-to-Chip Communications Interface" (hereinafter called "Fox I");

U.S. Provisional Patent Application No. 61/773,709, filed Mar. 6, 2013, naming John Fox, Brian Holden, Peter Hunt, John D Keay, Amin Shokrollahi, Andrew Kevin John Stewart, Giuseppe Surace, and Roger Ulrich, entitled "Methods and Systems for High Bandwidth Chip-to-Chip Communications Interface" (hereinafter called "Fox II");

U.S. Provisional Patent Application No. 61/812,667, filed Apr. 16, 2013, naming John Fox, Brian Holden, Ali Hormati, Peter Hunt, John D Keay, Amin Shokrollahi, Anant Singh, Andrew Kevin John Stewart, and Giuseppe Surace, entitled "Methods and Systems for High Bandwidth Communications Interface" (hereinafter called "Fox III");

U.S. patent application Ser. No. 13/842,740, filed Mar. 15, 2013, naming Brian Holden, Amin Shokrollahi, and Anant Singh, entitled "Methods and Systems for Skew Tolerance and Advanced Detectors for Vector Signaling Codes for Chip-to-Chip Communication" (hereinafter called "Holden I");

U.S. patent application Ser. No. 13/895,206, filed May 15, 2013, naming Roger Ulrich and Peter Hunt, entitled "Circuits for Efficient Detection of Vector Signaling Codes for Chip-to-Chip Communications using Sums of Differences" (hereinafter called "Ulrich I").

U.S. patent application Ser. No. 14/315,306, filed Jun. 25, 2014, naming Roger Ulrich, entitled "Multilevel Driver for High Speed Chip-to-Chip Communications" (hereinafter called "Ulrich II").

U.S. Provisional Patent Application No. 61/934,804, filed Feb. 2, 2014, naming Ali Hormati and Amin Shokrollahi, entitled "Method for Code Evaluation using ISI Ratio" (hereinafter called "Hormati I").

U.S. Provisional Patent Application No. 61/992,711, filed May 13, 2014, naming Amin Shokrollahi, entitled "Vector Signaling Code with Improved Noise Margin" (hereinafter called "Shokrollahi I").

U.S. Provisional Patent Application No. 62/023,163, filed Jul. 10, 2014, naming Amin Shokrollahi and Roger Ulrich, entitled "Vector Signaling Code with Improved Noise Margin" (hereinafter called "Shokrollahi II").

BACKGROUND

In communication systems, a goal is to transport information from one physical location to another. It is typically desirable that the transport of this information is reliable, is fast and consumes a minimal amount of resources. One common information transfer medium is the serial communications link, which may be based on a single wire circuit relative to ground or other common reference, or multiple such circuits relative to ground or other common reference. A common example uses singled-ended signaling ("SES"). SES operates by sending a signal on one wire, and measuring the signal relative to a fixed reference at the receiver. A serial communication link may also be based on multiple circuits used in relation to each other. A common example of the latter uses differential signaling ("DS"). Differential signaling operates by sending a signal on one wire and the opposite of that signal on a matching wire. The signal information is represented by the difference between the wires, rather than their absolute values relative to ground or other fixed reference.

There are a number of signaling methods that maintain the desirable properties of DS while increasing pin efficiency over DS. Vector signaling is a method of signaling. With vector signaling, a plurality of signals on a plurality of wires is considered collectively although each of the plurality of signals might be independent. Each of the collective signals is referred to as a component and the number of plurality of wires is referred to as the "dimension" of the vector. In some embodiments, the signal on one wire is entirely dependent on the signal on another wire, as is the case with DS pairs, so in some cases the dimension of the vector might refer to the number of degrees of freedom of signals on the plurality of wires instead of exactly the number of wires in the plurality of wires.

With binary vector signaling, each component or "symbol" of the vector takes on one of two possible values. With non-binary vector signaling, each symbol has a value that is a selection from a set of more than two possible values. The set of values that a symbol of the vector may take on is called the "alphabet" of the vector signaling code. A vector signaling code, as described herein, is a collection C of vectors of the same length N, called codewords. Any suitable subset of a vector signaling code denotes a "subcode" of that code. Such a subcode may itself be a vector signaling code. Orthogonal Differential Vector Signaling codes (ODVS) as described in [Cronie I] are one specific example of a vector signaling code as used in descriptions herein.

In operation, the coordinates of the codewords are bounded, and we choose to represent them by real numbers between −1 and 1. The ratio between the binary logarithm of the size of C and the length N is called the pin-efficiency of the vector signaling code.

A vector signaling code is called "balanced" if for all its codewords the sum of the coordinates is always zero. Balanced vector signaling codes have several important properties. For example, as is well-known to those of skill in the art, balanced codewords lead to lower electromagnetic interference (EMI) noise than non-balanced ones. Also, if common mode resistant communication is required, it is advisable to use balanced codewords, since otherwise power is spent on generating a common mode component that is cancelled at the receiver.

Additional examples of vector signaling methods are described in Cronie I, Cronie II, Cronie III, Cronie IV, Fox I, Fox II, Fox III, Holden I, Shokrollahi I, and Hormati I.

BRIEF DESCRIPTION

The unavoidable impedance anomalies seen in multi-drop communications channels introduce corresponding deep notches in the channel frequency response and a corresponding limitation of the effective data rate in conventional systems. This is true even if the channel spectrum after the notch does not show high attenuation and is still usable. A special time-ordered coding method is described which results in the emitted spectrum of the data stream transmitted into the channel having a notch at the same or at a similar frequency as the notch in the channel frequency response, permitting channel receivers to successfully decode the transmitted data stream.

DETAILED DESCRIPTION

It is well understood that at high data rates, communications channels must be treated as high-frequency transmission lines. As such, each connection anomaly in the communications signal path may introduce an impedance variation which causes some portion of the propagating transmit waveform to be reflected, both weakening the portion of the waveform continuing on, and producing a backwards-propagating waveform which may potentially be reflected from other impedance anomalies to produce delayed versions of the signal waveform which can distort or interfere with the primary waveform.

Figure 1:
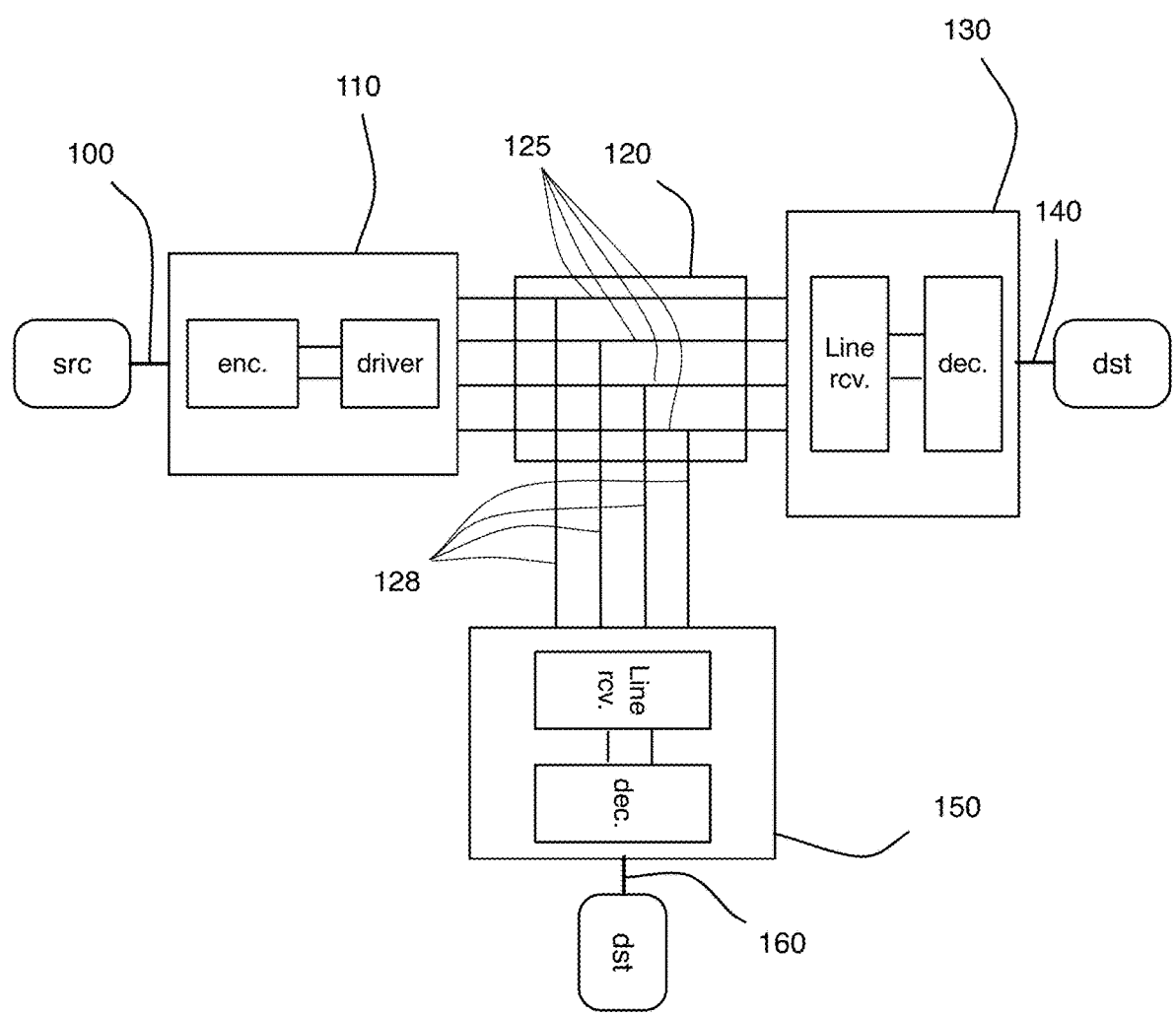
FIG. 1 illustrates a typical multidrop communications system comprising of transmitter 110 and receivers 130 and 150, interconnected by a multi-wire communications channel 120.

Multidrop communications channels such as illustrated in FIG. 1 may be profoundly impacted by such propagation issues. In the example shown, transmitting device 110 drives signals onto the wires 125 which collectively comprise communications channel 120. Receiving devices 130 and 150 are both potential recipients of such signals. However, the wires 128 through which receiving device 150 connects to communications channel 120 represents a "stub" transmission line element which represents a significant impedance anomaly in communications channel 120, as signals propagating on wires 125 must split and follow two paths to receiving devices 130 and 150.

Figure 3A:
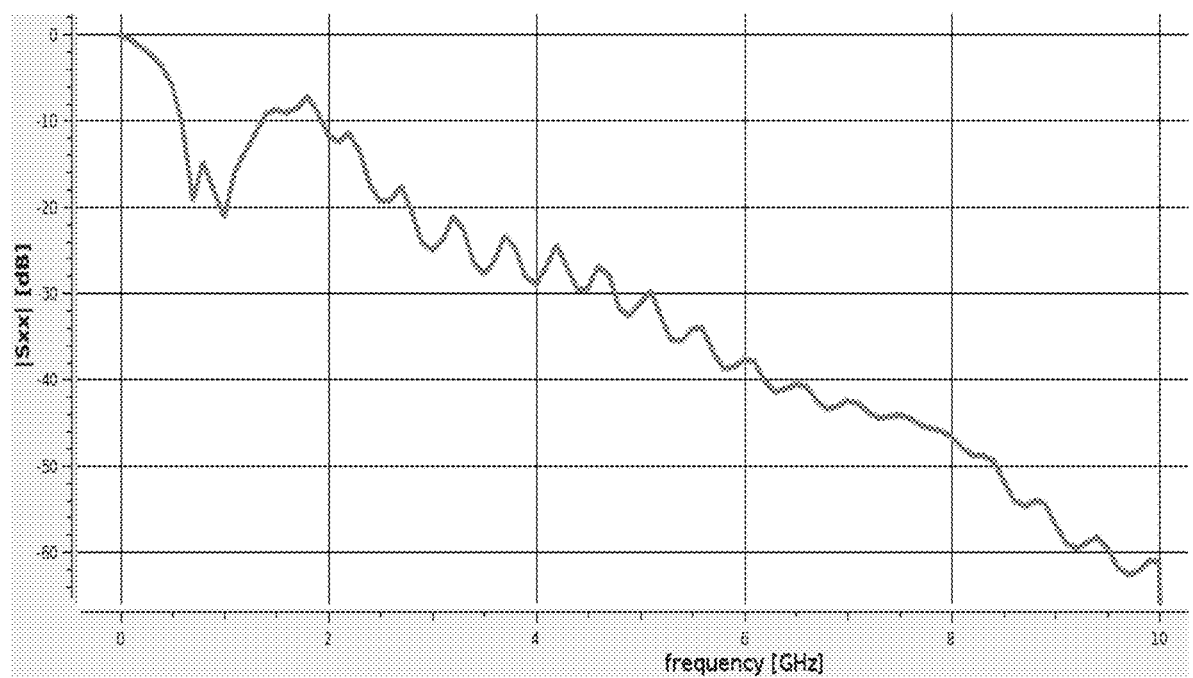
FIG. 3A shows the frequency response characteristics of an example channel, with FIG. 3B showing the same channel's impulse response.
Figure 3B:
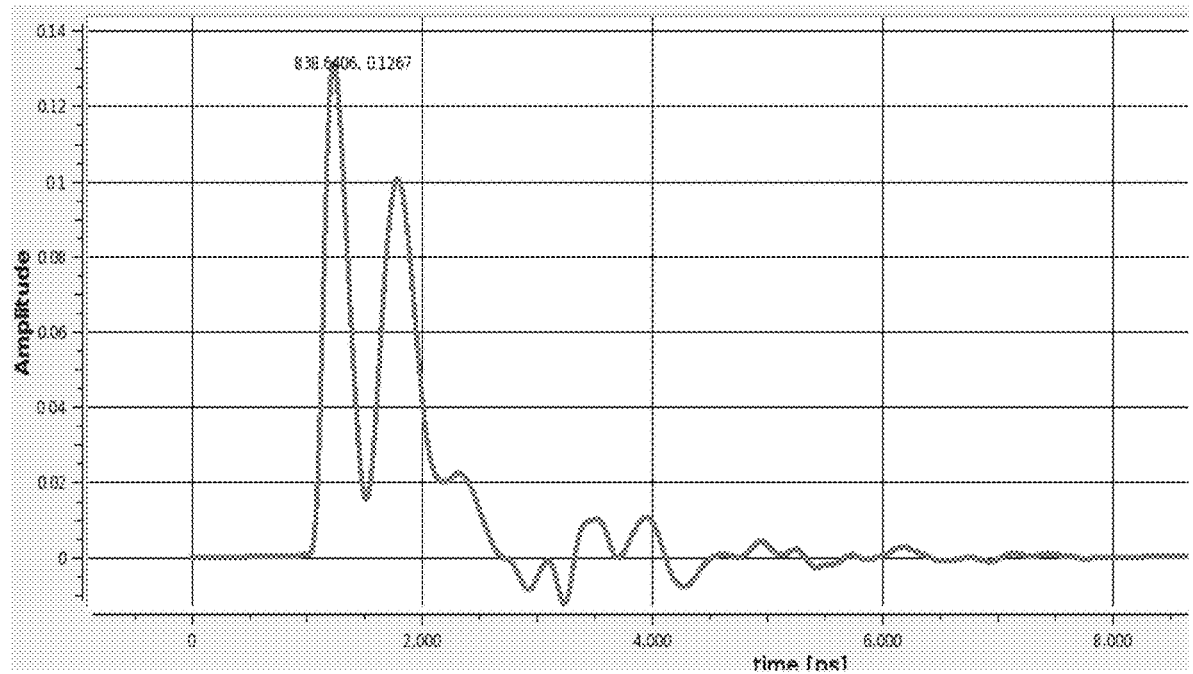

One familiar with the art will note that such a multidrop configuration will typically be associated with a notch in the frequency response characteristics measured for the channel, as shown by the graph of FIG. 3A, with the notch frequency inversely proportional to the propagation delay of the signal traversing the distance from the transmitter to the impedance anomaly, at the propagation velocity of the communications medium. In the time domain, this same effect will appear as a significant reflected signal with a time delay proportional to the distance from the transmitter to the impedance bump at the propagation velocity of the communications channel, as shown in the graph of FIG. 3B. As will be readily understood by those familiar with the art, additional multidrop connections will exacerbate this situation, with a worst case being the uniform periodic spacing intervals seen on busses in a multi-card backplane or in a stacked chip configuration.

Basic Concept

If one attempted to transmit digital signals over such a communications medium at varying data rates, one would observe that the "goodput" (i.e. the rate at which good or non-disrupted data is received) over the medium varies significantly, with particularly poor transmission characteristics occurring at rates at or above the notch frequencies of the frequency response. In the time domain, this may be interpreted as the transmitted signal appearing at a receiver simultaneous with a delayed version of a previously transmitted signal, resulting in a marginal or corrupted detection result.

Conversely, it is observed that if the transmission rate is set to an integer multiple of the notch frequency so as to create a "frame" of N data units $D_1, \ldots, D_N$, the data unit transmission interfering with, as an example, data unit $D_N$ must be one of the earlier-transmitted data units $D_1, \ldots, D_{N-1}$. Knowing the data to be transmitted in $D_N$ allows a value to be chosen for transmission in the earlier (e.g. interfering) time interval which will constructively interact with $D_N$ to facilitate its reception, one example being transmission of the same channel signal value during both the earlier and later time intervals. Alternatively, a value may be transmitted in the earlier time interval which will not impact reception of $D_N$, an example being transmission of a quiescent or "zero" value on a channel where the data signals are +1 and −1, another example being the inverse of the data, if the delayed interfering signal is also inverted.

Sequentially Transmitted Data Frame

A first embodiment utilizes a data frame whose period T is equal to $1/f_{notch}$, where $f_{notch}$ is the frequency of the first notch in the channel's frequency response. The frame is divided into 2*M partitions of equal duration, where M is an integer typically greater than one, the sequence of partitions representing the consecutively transmitted signal unit intervals for the data stream. The first half of the frame may be herein referred to as the first transmit frame of M symbols. The second half of the frame may be herein referred to as the subsequent transmit frame of M symbols. The general form of this frame is:

| Time | T = 0 | | | | | | | | T = 1/$F_{notch}$ |
|------|-------|---|---|---|---|---|---|---|-------------------|
| Data | $D_1$ | $D_2$ | $D_3$ | ... | $D_M$ | $D_1$ | $D_2$ | $D_3$ | ... $D_M$ | where $D_i$ represents the levels of the signaling scheme used for the transmission, e.g, ±1 for binary data transmission, and each of the M data units $D_1, \ldots, D_M$ are transmitted twice, with the same sequence of M transmissions emitted in the first transmit frame being repeated in the same order in the subsequent transmit frame, resulting in an overall throughput equal to $M*f_{notch}$. As one familiar with the art will observe, the frequency spectrum of such a periodically repeating message format has notches at frequencies) notch and therefore, we can recover the data sequence $D_1, D_2, D_3, \ldots, D_M$ successfully at the receiver by sampling at $(2*M)*f_{notch}$ rate, discarding the first set of M samples (i.e. those in the first transmit frame) and keeping the subsequent set of M samples as representing $D_1, \ldots, D_M$.

Figure 2:
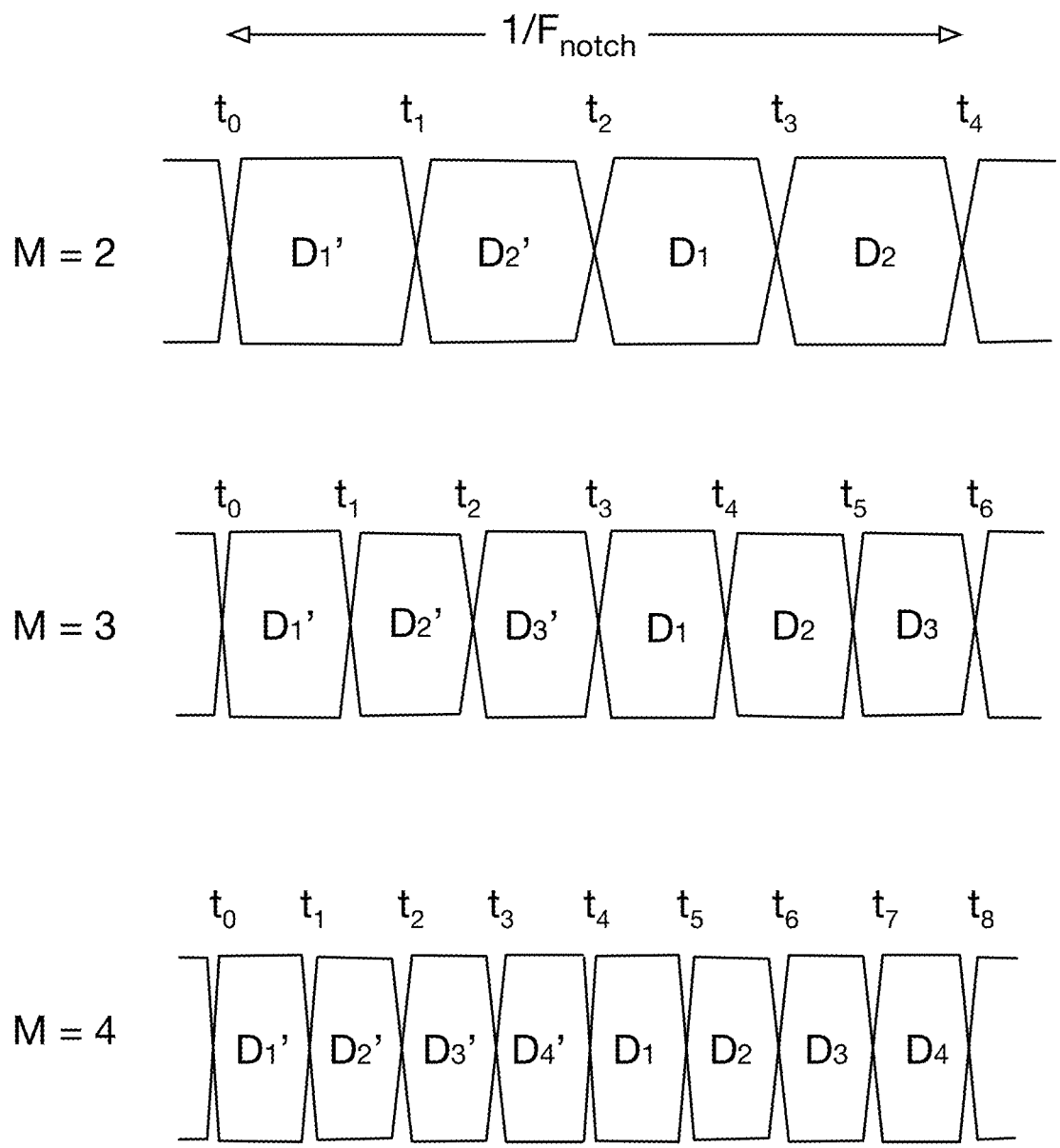
FIG. 2 illustrates data frame sequences in accordance with at least one embodiment using different rate multiplier values M.

This data frame sequence is also illustrated in FIG. 2, where binary data transmissions are shown with M=2, M=3, and M=4. The sequential data values being transmitted in the subsequent transmit frame are shown as $D_1, \ldots, D_M$ and the compensatory values being transmitted in the first transmit frame are shown as $D_1', \ldots, D_M'$. Thus for the M=2 example, the raw transmission rate is $4*f_{notch}$, with each of data units $D_1$ and $D_2$ being transmitted twice within the data frame spanning time $t_0$ to time $t_3$, with the overall duration of the frame being $1/f_{notch}$ as shown.

In the time domain, a multidrop channel with a notch at $f_{notch}$ adds a delayed and attenuated version of the input signal to itself where the delay is equal to $t=1/(2*f_{notch})$. Looking at our data frame, it is obvious that while the data elements transmitted during the first transmit frame will interfere with data elements of the subsequent transmit, forming a channel-induced superposition. This channel-induced superposition may be made additive with the described timing and repetitive data transmission, thus providing an increased receiver eye opening.

ALTERNATIVE EMBODIMENTS

An alternative embodiment transmits one half frame of zeroes or a comparable quiescent channel signal in the first transmit frame, and data in the subsequent transmit frame, thus damping out the interfering delayed signals. Thus, referring to FIG. 2, in this embodiment the compensatory values $D_1', \ldots, D_M'$ would be zeroes. However, such an embodiment will present a smaller receive eye vertical opening than the previously-described method of sending each data value twice, as there is no constructive interference to boost the received signal. It may be noted that with this method the receiver will also see signals in the first half of the subsequent frame including an immediate zero value and a delayed data value from the second half of the previous frame, providing an opportunity for an embodiment making two independent observations of the same set of M bits.

A further alternative embodiment transmits one half frame of inverted data values in the first transmit frame, followed by one half frame of non-inverted data values in the subsequent transmit frame, providing a channel-induced superposition representing constructive interference in situations where the interfering delayed signal is inverted by reflection. Referring again to FIG. 2, in this embodiment the compensatory values $D_1', \ldots, D_M'$ would be the logical inverse of the values transmitted as $D_1, \ldots, D_M$.

As will be apparent to one familiar with the art, equivalent patterns for the data frame include data followed by inverted data, data followed by zeroes, etc.

ADDITIONAL VARIATIONS

Figure 8A:
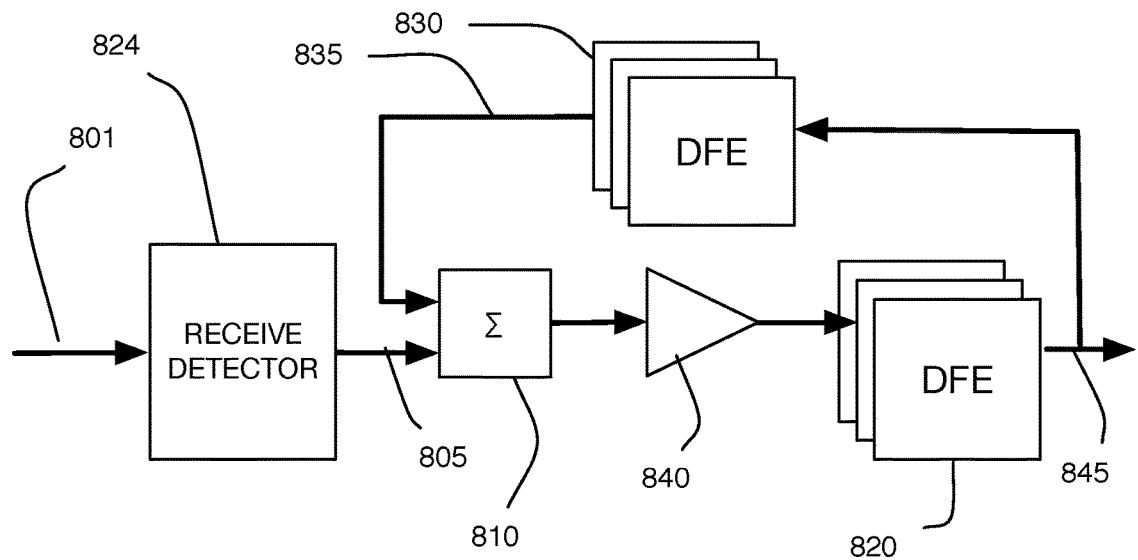
FIGS. 8A and 8B are block diagrams of receivers implementing decision feedback equalization (DFE), in accordance with some embodiments.
Figure 8B:
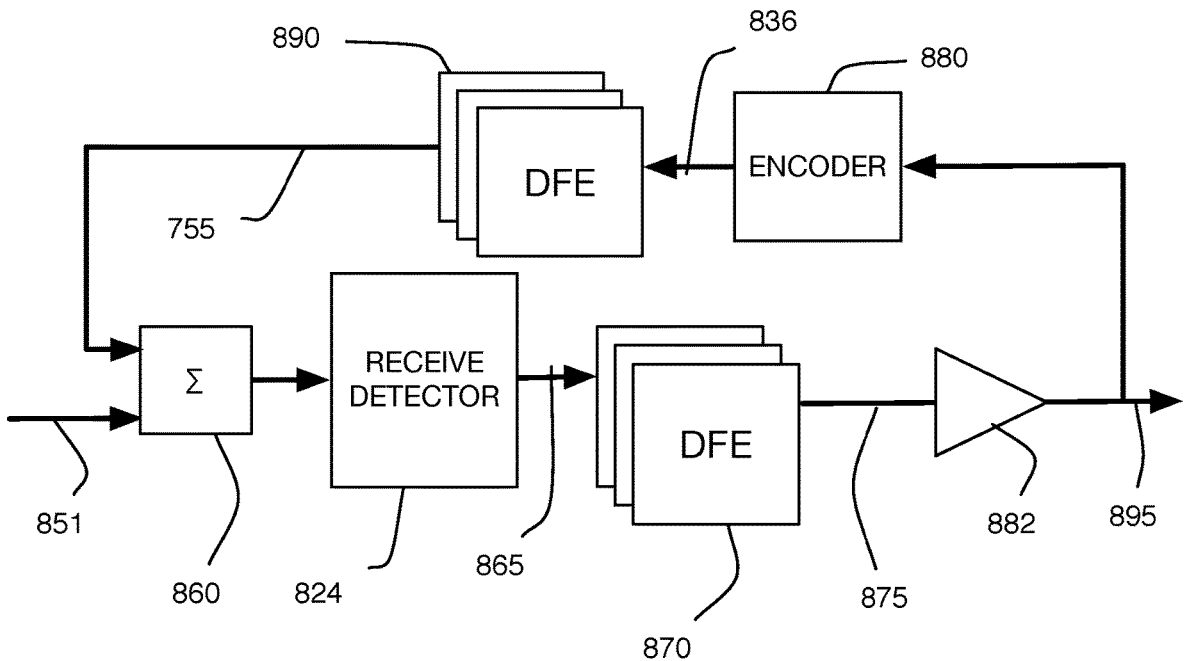

It should be noted that the described embodiments are applied per-wire, thus may be combined with known multi-wire coding schemes in an obvious way, i.e. transmitting sequences of codewords of a vector signaling code on multiple wires rather than single bits on one wire, and repeating the sequence of codewords during the second half of the frame. Similarly, although the examples provided illustrate binary channel signaling for descriptive convenience, no limitation is implied as present embodiment are directly applicable to ternary, quaternary, and higher-order signaling as well. FIGS. 8A and 8B are block diagrams of two exemplary receiver structures for detecting vector signaling codes as described in [Fox III].

Because the transmission rate for the data frame is determined based on the channel notch frequency, the notch frequency will ideally be known at least approximately before-hand. For common configurations such as backplanes, stacked chips, etc. the physical dimensions and composition of the channel is fixed, and its expected characteristics are thus well known. Alternatively, other embodiments may measure the channel and set the communications data rate as part of a setup or initialization procedure for the circuit, the channel measurement either being performed directly as a signal strength vs. frequency plot, or indirectly by measuring pulse reflection times (i.e. as a time-domain reflectometer or TDR measurement.)

Some embodiments may maintain individual channel compensation parameters per receiver or set of receivers, so as to optimize reception for the anticipated, calculated, or measured reflection combinations at those particular receiver locations. Other embodiments may use a consensus or average compensation parameters for all receivers. These compensation parameters may include the notch frequency, multiplication factor M, and format of the data frame, including polarity and type of corrective signals incorporated in it. The compensation parameters may differ for different transmitters; as one particular example, the characteristics of the channel and thus the preferred compensation parameters may not be symmetric in both directions.

In practical embodiments, the transmission rate may merely approximate the optimal $2*M*f_{notch}$ rate with only modest reduction in received signal quality, determined in part by the depth and width of the channel notch.

Illustrated Results

Figure 4A:
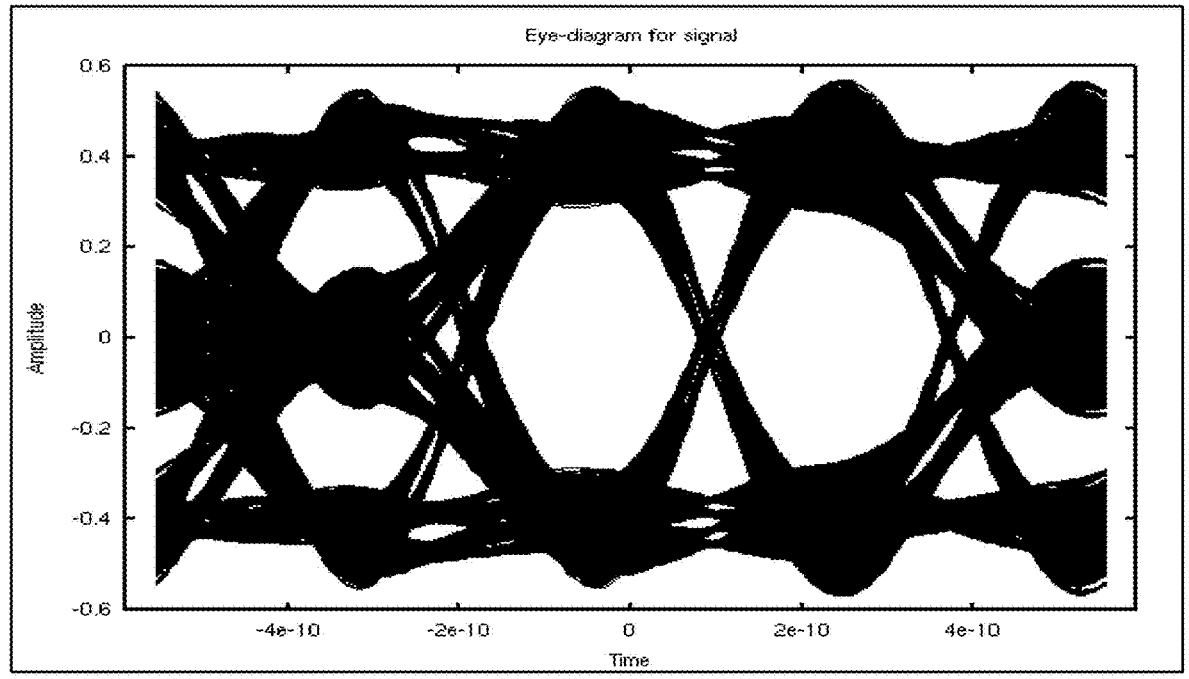
FIG. 4A is a receive eye diagram for one embodiment using the channel of FIG. 3A with M=2.
Figure 4B:
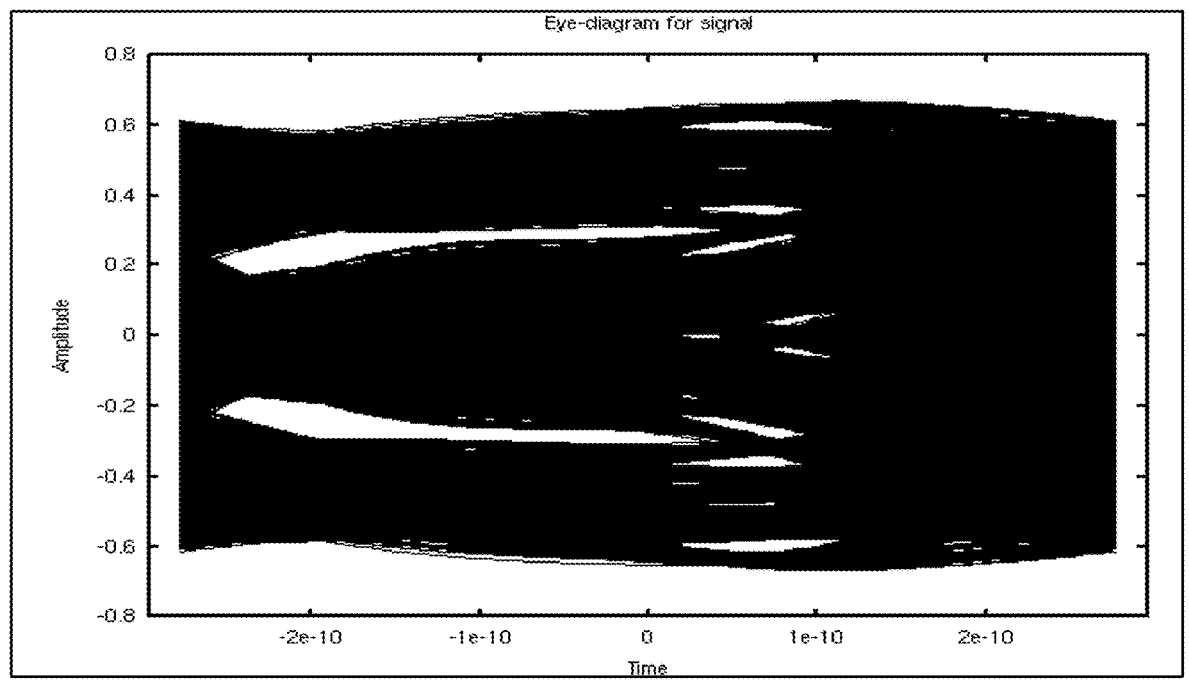
FIG. 4B is a receive eye diagram of the same channel and raw signaling rate, without benefit of described embodiments.

An embodiment having a channel with a frequency response notch at approximately 900 MHz as shown in the graph of FIG. 3A was used with a data frame where M=2, resulting in a raw transmit data rate of 1.8 Gbps. A transmit FIR filter was used equal to [0.7, −0.3]. The receive eye diagram in this configuration is shown as FIG. 4A. For comparison, the receive eye diagram when sending arbitrary data (i.e. without the described data frame and its duplicated transmissions) at 1.8 Gbps over this channel is shown as FIG. 4B, showing significantly poorer signal reception relative to the described signaling method.

Figure 5:
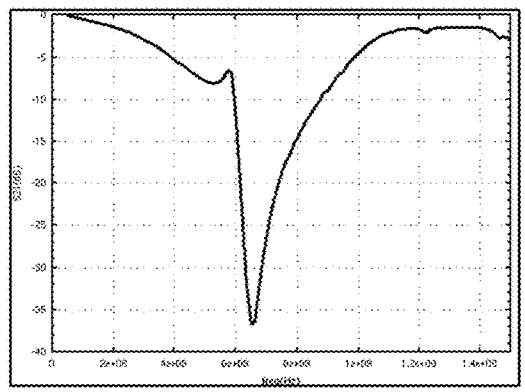
FIG. 5 shows the frequency response characteristics of another example channel, and receive eye diagrams for an embodiment utilizing different values of rate multiplier M.
Figure 5:
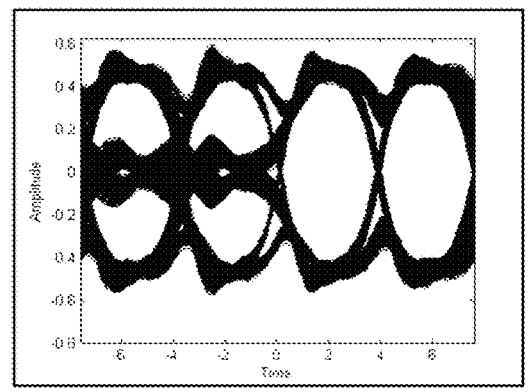
Figure 5:
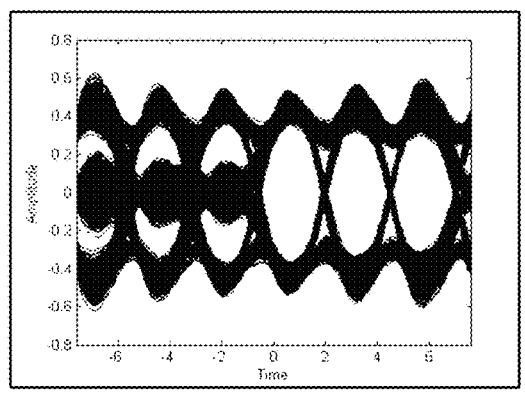
Figure 5:
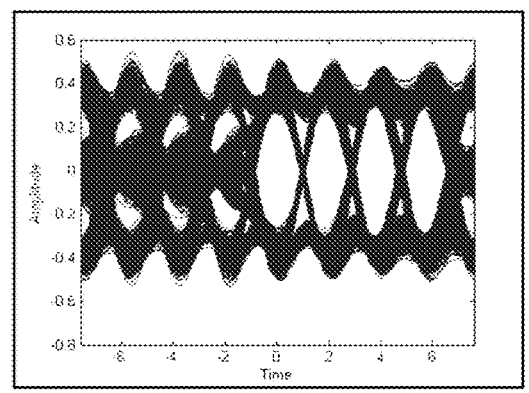
Figure 5:
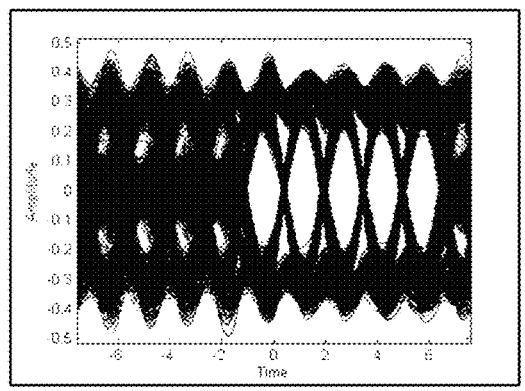
Figure 5:
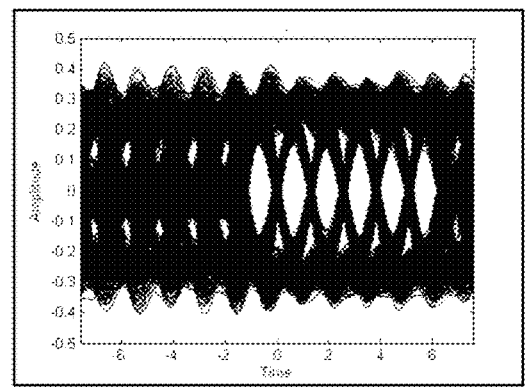

FIG. 5 illustrates the performance characteristics of another embodiment. The deeply notched frequency response characteristics of the channel used by this embodiment is shown in the first graph labeled "Channel", with subsequent graphs labeled "M=2" through "M=6" showing the receiver eyes for transmission across that channel with increasing values of M.

FURTHER EMBODIMENTS

The following descriptions use the term "delta" as a relative metric of the depth of the frequency response notch for the channel, with delta=1 for a very deep notch and delta=0 for no notch at all.

In a further embodiment using single-ended NRZ coding, a previously-described example data frame of [d1 d2 d1 d2] is replaced by a data frame of [d1 d2 d1 d2 d3 d4]. Bits d1 and d2 (at positions 3 and 4) can be decided directly and bits d3 and d4 can be decided with known Decision Feedback Equalization (DFE) techniques at the receiver. Detection of d3 needs to know d1 (the earlier signal interfering with it) and, similarly, detecting d4 needs to know d2. DFE allows these earlier received signals to be subtracted from the present sample, leaving a disambiguated sample to be detected. In this embodiment, the frame length (the duration in time of [d1 d2 d1 d2 d3 d4]) is set to $1.5/f_{notch}$, allowing data transmission at the rate of $4/1.5*f_{notch}=2.66*f_{notch}$. The DFE level depends on delta and can be set adaptively. The same technique works with a data frame structured as [0 0 d1 d2 d3 d4].

A second further embodiment uses a 5-level driver, and sends the sequence [a b a b c-a d-b] in $1.5/f_{notch}$ time. As one familiar with the art will note, the expected receive sequence will thus be [junk, junk, a*(1+delta), b*(1+delta), c−a*(1−delta), d−b*(1−delta)]. If delta is close to 1 (e.g. −20 dB or so), then the vertical opening of c−a*(1−delta), d−b*(1−delta) is slightly smaller than the normal vertical opening (same for the horizontal opening), and the symbols are principally binary (thus, according to the teachings of [Hormati I], ISI ratio=1.) This embodiment allows 4 bits to be sent in $1.5/f_{notch}$ time, so in total $2.666*f_{notch}$ bits/second/wire.

A third further embodiment is applicable if the reflection is not so powerful, i.e. delta is, for example, on the order of 0.3. In this embodiment, a Tx FIR of [1 0−delta] is used to filter the transmitted data. On the receiver side, one obtains data in the form $d2-delta^2$ d0~=d2 and since delta is small, it will not close the eyes considerably. Prior knowledge or measurement of delta is needed by this embodiment.

If delta is close to 1 (i.e. a deep notch), a fourth further embodiment uses frames like [d0 d1 d0 d1 (d0*d2) (d1*d3) (d0*d2*d4) (d1*d3*d5)] over $2/f_{notch}$, sending data at the rate of $6/2*f_{notch}=3*f_{notch}$. On the receiver side, the first two UIs in this frame get corrupted by the previous frame. Bits d0 and d1 at positions 3 and 4 can be extracted by PAM2 detection. For the next bit we obtain d0*d2+delta*d0=d0*(delta+d2)~=d0*(1+d2). One can extract d2 by performing a PAM3 detection to see if d0*(1+d2) is zero or not. If zero, d2=−1 otherwise, d2=1. In the same way, one can obtain bits d3, d4 and d5. As a further advantage, this technique limits the error propagation.

Modern high-speed serial receiver designs are strongly reliant on Digital Feedback Equalization methods, which are well known solutions for compensation of transmission medium perturbations including signal reflections and crosstalk. It had been observed that such perturbations are driven by delayed components of previously transmitted data (e.g. as delayed reflections from impedance discontinuities in the communications path) which interfere with subsequently transmitted data. Thus, detected data may be stored by a DFE system at the receiver, and suitably delayed and attenuated components subtracted from the current input signal so as to nullify those effects.

This simple feedback loop DFE is constrained by the need to fully detect the value of the currently received data bit in time to feed it back as compensation for signals in the next signal interval. As transmission rates increase, this window of time becomes smaller. Furthermore, distributing receive processing across multiple processing phases increases throughput, at the cost of latency. Thus, information about a given receive interval's data may not be available for many receive cycles. Solutions using "unrolled" DFE correction are known, allowing inline compensation to be performed for the critical initial receive intervals of the DFE process.

Classic binary DFE solutions may be combined with the described H4 receiver designs at the point where individual modulation modes (representing individual data bits) are detected, if the signal reflections requiring compensation are similar for the four signal paths. Each mode is communicated as signals over all four signal paths, but the combinations of such signals is by definition orthogonal for each mode, thus signal perturbations on distinct paths is possible through judicious combination of modal compensations. It should be noted that signals encoded on the wire may take on any of four values (albeit two at any one time) while signals representing each transmission mode are always two-valued. Thus, storage and delay components of a DFE are at least twice as complex if performed on wire signals versus transmission mode signals.

One embodiment in accordance with the invention is shown in the block diagram of FIG. 8A. The four receive signal inputs 801 are input to receive detector 824 as described in [Fox III], which in this example is configured to produce three analog outputs 805 corresponding to the transmission modes used to communicate each data bit. On each such analog output, a correction signal 835 from one of three binary DFE circuits 830 is summed 810 to nullify the signal distortions on that analog signal, and the signals optionally converted to digital value by comparators 840. As is common practice, the Decision Feedback Equalization corresponding to at least the first several bit times preceding the current receive interval are "unrolled" or performed inline along with the data path processing for higher performance, rather than by a closed loop feedback method, by the three unrolled binary DFE circuits 820, with DFE corresponding to the remaining bit times being compensated being performed by conventional feedback loop DFE at 830.

In the embodiment shown, feedback DFE circuits 830 accept digital bit inputs and output appropriately scaled and delayed analog signals, while unrolled DFE circuits 820 accepts digital inputs and produces digital bit outputs. Other embodiments in accordance with the invention may utilize different combinations of input signals and output results in the DFE components. In one embodiment, the three DFE circuits 830 operate on analog values 825, rather than from the equivalent binary values 845 obtained from comparators 840.

An alternative and more complex DFE embodiment of the invention is also known, which may be applied if the reflections are markedly different amongst the four wires. In the approach shown in FIG. 8B, DFE is performed by adding 860 four compensation signals 855, one for each analog wire signal 851 rather than for each transmission mode, allowing independent equalization for each physical wire path at the cost of significantly greater complexity and power consumption. The compensated wire signals are processed by receive detector 824 to produce outputs 865. In such an embodiment, at least the first several bits may be equalized by an unrolled binary DFE 870 operating on the three individual modulation modes as before. For corrections beyond that amount, an enhanced architecture DFE is used. The three data outputs 895 are re-encoded into the corresponding four level symbol representation 836 used on the line, and four four-level DFE circuits 890 perform the remainder of the equalization, each operating on one wire-level signal to produce compensation signals 855. In some embodiments, the function of digital comparators 882 are performed within DFE 870, so that outputs 875 are equivalent to outputs 895. Similarly, in at least one embodiment unrolled DFE 870 operates on digital output signals from receive detector 824 representing binary data bits.

The number of bits of DFE compensation utilized in either described embodiment of the invention, both as inline "unrolled" DFE and as conventional feedback DFE, may be chosen based on the needs of the specific communications system, without limitation. At least one embodiment in accordance with the invention includes at least some DFE operations within the multiphase processing portion of the receiver.

EMBODIMENTS

Figure 6:
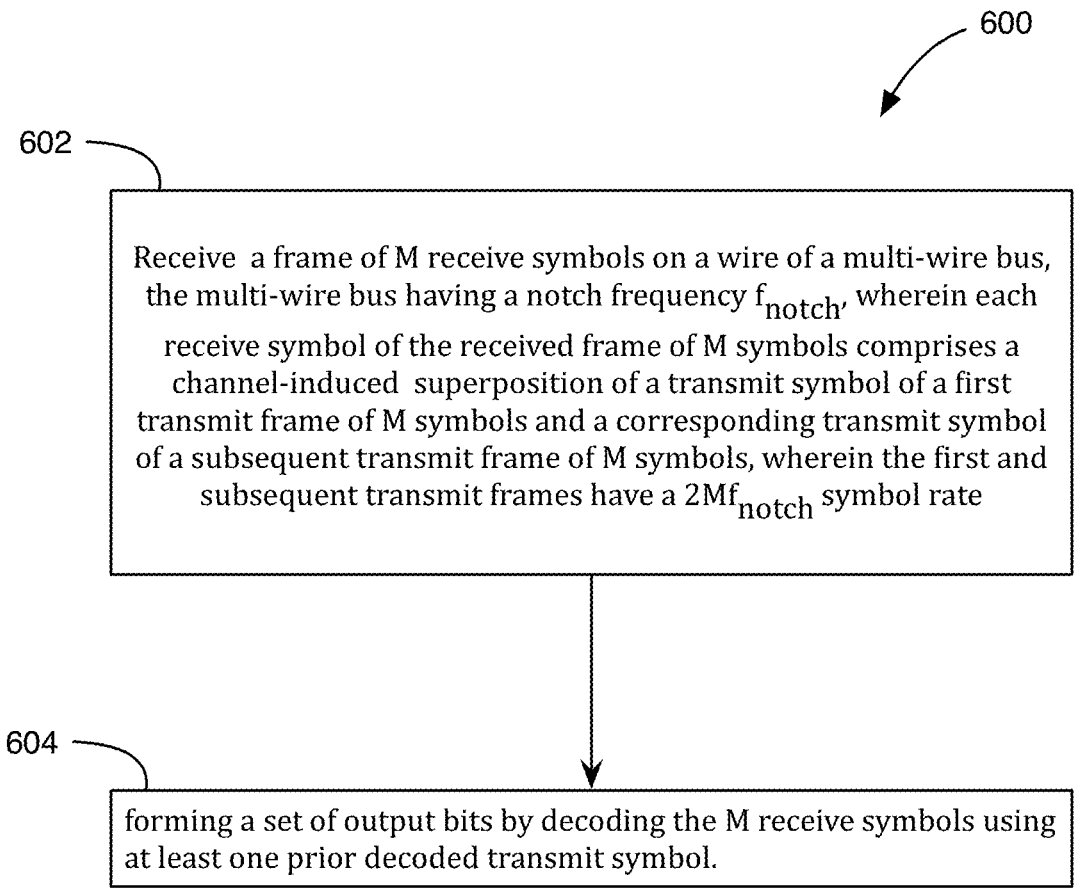
FIG. 6 is a flowchart of a process in accordance with at least one embodiment.

As shown in FIG. 6, a method 600 in accordance with at least one embodiment comprises receiving, at step 602, a frame of M receive symbols on a wire of a multi-wire bus, the multi-wire bus having a notch frequency $f_{notch}$, wherein each receive symbol of the received frame of M symbols comprises a channel-induced superposition of a transmit symbol of a first transmit frame of M symbols and a corresponding transmit symbol of a subsequent transmit frame of M symbols, wherein the first and subsequent transmit frames have a $2*M*f_{notch}$ symbol rate, and, forming, at step 604, a set of output symbols by decoding the M receive symbols using at least one prior decoded transmit symbol.

In at least one embodiment, first transmit frame of M symbols is equal to the subsequent transmit frame of M symbols.

In at least one embodiment, the first transmit frame of M symbols comprises all quiescent symbols.

In at least one embodiment, the first transmit frame of M symbols is an inverted version of the subsequent transmit frame of M symbols.

In at least one embodiment, the first transmit frame of M symbols and the subsequent transmit frame of symbols are distinct. In at least one embodiment, the first transmit frame of M symbols comprises at least one prior decoded transmit symbol, and the decoding the M receive symbols comprises forming at least one output symbol based on the superposition of the at least one prior decoded transmit symbol and the corresponding transmit symbol of the subsequent transmit frame In at least one embodiment, the notch frequency is determined by an impedance anomaly.

In at least one embodiment, the impedance anomaly is represented as multiple receivers connected to the multi-wire data bus.

In at least one embodiment, the corresponding transmit symbol represents a combination of at least 2 distinct symbols.

Figure 7:
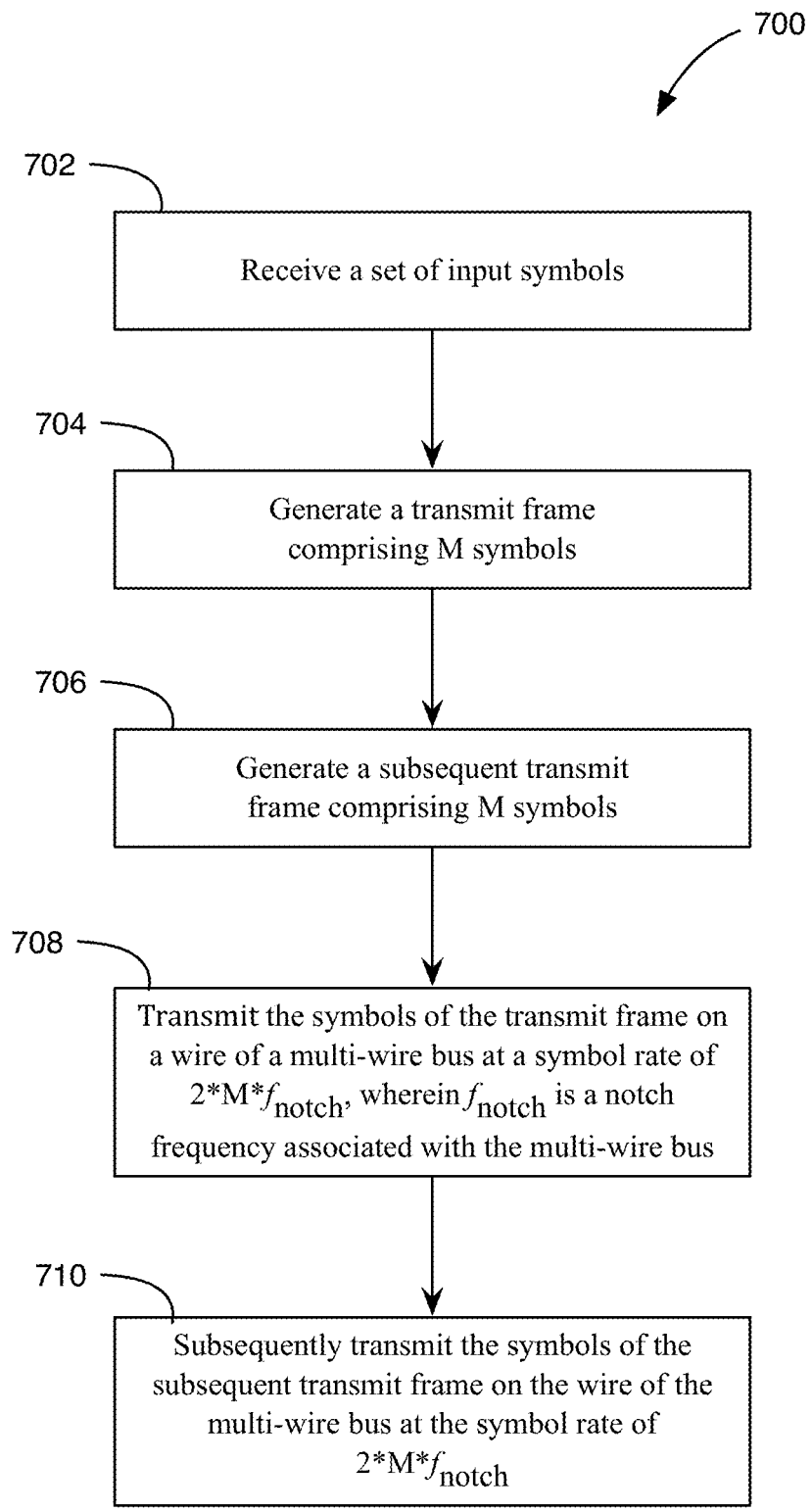
FIG. 7 is a flowchart of another process in accordance with at least one embodiment.

As shown in FIG. 7, a method 700 in accordance with at least one embodiment comprises receiving, at step 702, a set of input symbols, generating, at step 704, a transmit frame comprising M symbols, generating, at step 706, a subsequent transmit frame comprising M symbols, transmitting, at step 708, the symbols of the transmit frame on a wire of a multi-wire bus at a symbol rate of $2*M*f_{notch}$, wherein $f_{notch}$ is a notch frequency associated with the multi-wire bus, and, subsequently transmitting, at step 710, the symbols of the subsequent transmit frame on the wire of the multi-wire bus at the symbol rate of $2*M*f_{notch}$.

In at least one embodiment, an apparatus comprises a wire of a multi-wire bus configured to receive a frame of M receive symbols, the multi-wire bus having a notch frequency $f_{notch}$, wherein each receive symbol of the received frame of M symbols comprises a channel-induced superposition of a transmit symbol of a first transmit frame of M symbols and a corresponding transmit symbol of a subsequent transmit frame of M symbols, wherein the first and subsequent transmit frames have a $2*M*f_{notch}$ symbol rate, and, a decoder configured to form a set of output symbols by decoding the M receive symbols using at least one prior decoded transmit symbol.

In at least one embodiment the first transmit frame of M symbols is equal to the subsequent transmit frame of M symbols.

In at least one embodiment the first transmit frame of M symbols comprises all quiescent symbols.

In at least one embodiment the first transmit frame of M symbols represents an inverted version of the subsequent transmit frame of M symbols.

In at least one embodiment the first transmit frame of M symbols and the subsequent transmit frame of symbols are distinct.

In at least one embodiment the first transmit frame of M symbols comprises at least one prior decoded transmit symbol, and the decoder is further configured to generate at least one output symbol based on the superposition of the at least one prior decoded transmit symbol and the corresponding transmit symbol of the subsequent transmit frame.

In at least one embodiment the notch frequency is determined by an impedance anomaly.

In at least one embodiment the impedance anomaly is represented as a plurality of receivers connected to the multi-wire data bus.

In at least one embodiment the apparatus further comprises a set of input wires, each input wire configured to receive a set of input symbols, an encoder configured to generate a transmit data frame comprising M symbols and a subsequent transmit data frame comprising M symbols, and a driver configured to transmit the symbols of the transmit data frame on the wire of the multi-wire bus at a symbol rate of $2*M*f_{notch}$, wherein $f_{notch}$ is a notch frequency associated with the multi-wire bus and subsequently transmit the symbols of the subsequent transmit data frame at the symbol rate of $2*M*f_{notch}$.

In at least one embodiment the corresponding transmit symbol represents a combination of at least 2 input symbols.

The examples provided herein describe interconnection of a transmitting device and multiple receiving devices in a multi-drop networked configuration for descriptive simplicity. However, this should not be seen in any way as limiting the scope of the described embodiments. The methods disclosed in this application are equally applicable to other interconnection topologies having significant frequency response notches and other communications protocols including full-duplex as well as half-duplex and simplex communications. Similarly, wired communications are used as illustrative examples, the embodiments also being applicable to other communication media including optical, capacitive, inductive, and wireless communications. Thus, descriptive terms such as "voltage" or "signal level" should be considered to include equivalents in other measurement systems, such as "optical intensity", "RF modulation", etc. As used herein, the term "physical signal" includes any suitable behavior and/or attribute of a physical phenomenon configured to convey information. Physical signals may be tangible and non-transitory.

We claim:

1. A method comprising:
receiving a plurality of symbols, each symbol of the plurality of symbols received via a respective wire of a multi-wire bus, the plurality of symbols comprising channel-induced superpositions of symbols of a first transmitted codeword with corresponding symbols of a subsequent transmitted codeword, the first and subsequent transmitted codewords sent at a rate that is an even integer multiple of a notch frequency $f_{notch}$ associated with the multi-wire bus; and
forming a set of corrected symbols by applying decision feedback equalization (DFE) correction factors to the received plurality of symbols based on a previously-determined set of output symbols, the previously-determined set of output symbols representative of the symbols of the first transmitted codeword; and
decoding the set of corrected symbols to form a set of output bits.

2. The method of claim 1, wherein each symbol of the first and second subsequent transmitted codewords are selected from at least a ternary alphabet.

3. The method of claim 1, wherein the DFE correction factor are determined at least in part by a depth of a frequency response notch for the multi-wire bus.

4. The method of claim 1, wherein the plurality of symbols comprises M symbols, and the even integer multiple of the notch frequency $f_{notch}$ is $2*M*f_{notch}$.

5. The method of claim 1, wherein the channel-induced superposition occurs on the multi-wire bus at an input to a receiver.

6. The method of claim 1, wherein the notch frequency $f_{notch}$ is determined by an impedance anomaly.

7. The method of claim 6, wherein the impedance anomaly is associated with multiple receivers connected at different locations to the multi-wire bus.

8. An apparatus comprising:
a receiver configured to receive a plurality of symbols, each symbol of the plurality of symbols received via a respective wire of a multi-wire bus, the plurality of symbols comprising, on the multi-wire bus at an input of the receiver, channel-induced superpositions of symbols of a first transmitted codeword with corresponding symbols of a subsequent transmitted codeword, the first and subsequent transmitted codewords sent at a rate that is an even integer multiple of a notch frequency $f_{notch}$ associated with the multi-wire bus; and
a decoder configured to generate a set of corrected symbols by applying decision feedback equalization (DFE) correction factors to the received plurality of symbols based on a previously-determined set of output symbols, the previously-determined set of output symbols representative of the symbols of the first transmitted codeword, and to decode the set of corrected symbols to form a set of output bits.

9. The apparatus of claim 8, wherein each symbol of the first and subsequent transmitted codewords are selected from at least a ternary alphabet.

10. The apparatus of claim 8, wherein the DFE correction factor are determined at least in part by a depth of a frequency response notch for the multi-wire bus.

11. The apparatus of claim 8, wherein the plurality of symbols comprises M symbols, and the even integer multiple of the notch frequency $f_{notch}$ is $2*M*f_{notch}$.

12. The apparatus of claim 8, wherein the channel-induced superposition occurs on the multi-wire bus at an input to the receiver.

13. The apparatus of claim 8, wherein the notch frequency $f_{notch}$ is determined by an impedance anomaly.

14. The apparatus of claim 13, wherein the impedance anomaly is associated with multiple receivers connected at different locations to the multi-wire bus.

15. A method comprising:
encoding a set of information symbols into first and second frames of transmit symbols, wherein each symbol of the second frame of transmit symbol is pre-equalized by forming a linear combination of an information symbol of the set of information symbols associated with the first transmit frame of symbols and a corresponding information symbol of the set of information symbols associated with the second transmit frame of symbols; and
transmitting each symbol of the first and second frames of transmit symbols over a wire of a multi-wire bus at a rate that is an even integer multiple of a notch frequency $f_{notch}$ associated with the multi-wire bus to form channel-induced superpositions of each symbol of the first frame of transmit symbol with corresponding symbols of the second transmit frame of symbols.

16. The method of claim 15, wherein the notch frequency $f_{notch}$ is determined by an impedance anomaly.

17. The method of claim 16, wherein the impedance anomaly is associated with multiple receivers connected at different locations to the multi-wire bus.

18. The method of claim 15, wherein each symbol of the first and second frames of transmit symbols is transmitted using a multi-level driver.

19. The method of claim 15, wherein each information symbol of the set of information symbols has at least a ternary value.

20. The method of claim 15, wherein each of the first and second transmit frames of symbols comprise M symbols, and the even integer multiple of the notch frequency $f_{notch}$ is $2*M*f_{notch}$.

* * * * *